Dec. 14, 1948. T. A. COCHARY Re. 23,059

OPEN BACK SHOE WITH STIFFENING MEANS

Original Filed March 28, 1947 2 Sheets-Sheet 1

INVENTOR.
Thomas A. Cochary
BY
Kenway & Wilson
Attys

Dec. 14, 1948. T. A. COCHARY Re. 23,059
OPEN BACK SHOE WITH STIFFENING MEANS
Original Filed March 28, 1947 2 Sheets-Sheet 2
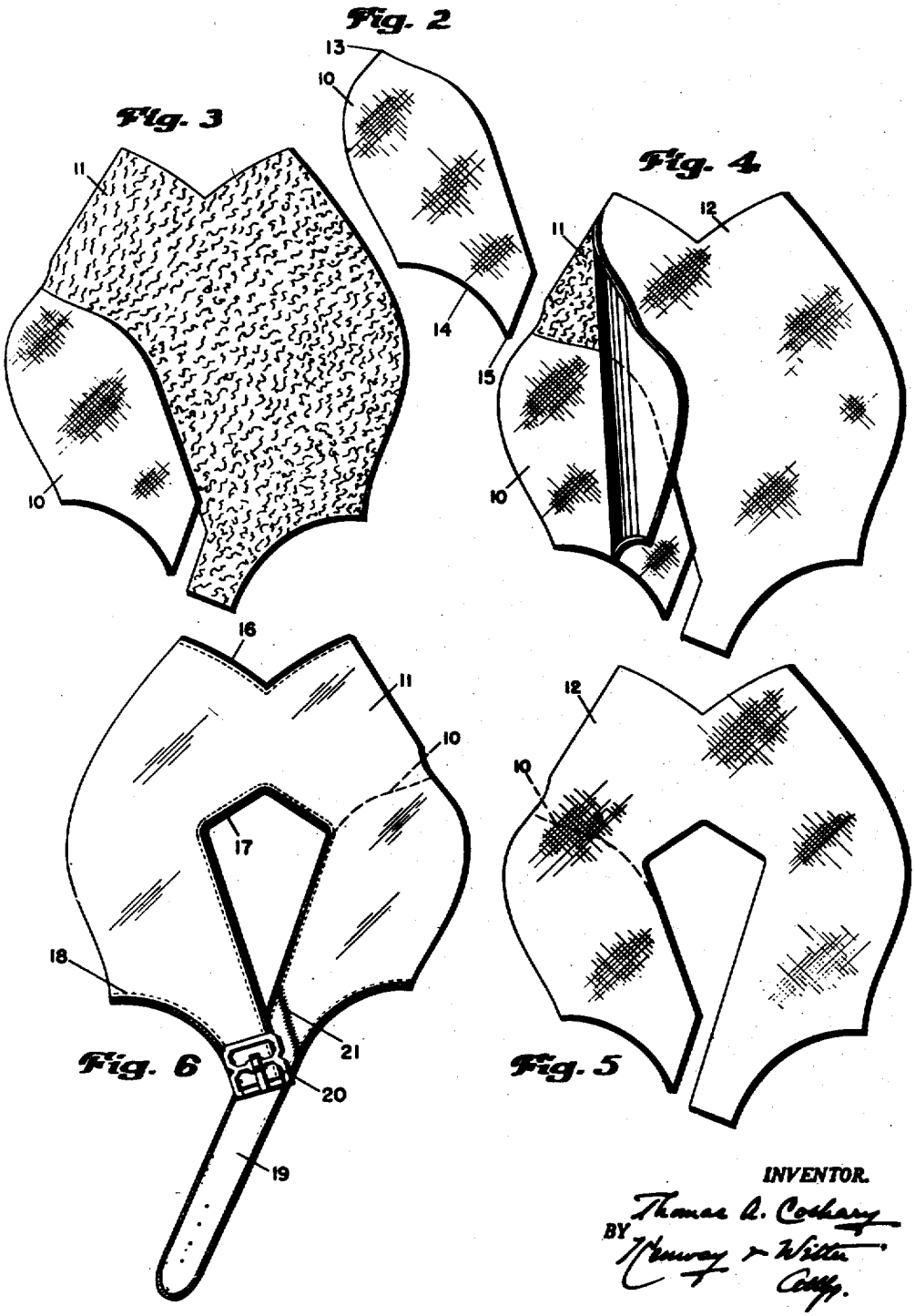
INVENTOR.
Thomas A. Cochary
BY Kenway & Witter
Attys.

Reissued Dec. 14, 1948 Re. 23,059

UNITED STATES PATENT OFFICE 23,059

OPEN-BACK SHOE WITH STIFFENING MEANS

Thomas A. Cochary, Brockton, Mass.

Original No. 2,446,169, dated August 3, 1948, Serial No. 737,817, March 28, 1947. Application for reissue September 28, 1948, Serial No. 51,562

3 Claims. (Cl. 36—8.5)

This invention consists in a new and improved shoe of the open back type and in a novel method of making the same.

Open back shoes now in demand for women's wear have had the serious objection that they retain for a relatively short time the fine lines imparted to them by the last in the manufacturing process. This is largely due to the fact that shoes of this type have no counterstiffener. In women's shoes of more conventional type the whole rear portion of the upper is shaped and sustained by a counterstiffener that is molded accurately to the shape of the last and may be relied upon to maintain its molded shape for substantially the whole life of the shoe. On the other hand, open back shoes are cut away and present an aperture above the heel seat which is substantially the shape of the usual counter stiffener. Accordingly, there is nothing whatever in this location to assist the upper in maintaining its shape in wear.

The object of the present invention is to provide a shoe of the open back type having a stiffening and reinforcing member included in the structure of the upper throughout its shank portion. I have discovered that such a member supplies the want of a counterstiffener and tends effectively to bring out and maintain in the shoe the fine lines of the desired contour. In those cases where the stiffener is located in the inside shank portion of the upper, the stiffener has the additional function of an arch supporting member and thus improves not only the appearance of the shoe but its comfort to the foot of the wearer.

The open back shoe of my invention may be produced by inserting a solvent-softening blank having a curved rear edge between the piles of a lined upper having a curved rear edge defining the aperture of the open back, registering the curved edges of the said blank and upper and fastening the blank in place in the shank portion thereof, then softening the blank by liquid solvent applied through the lining, shaping an upper to the last, and finally causing the blank to stiffen in conformity to the shape thereof.

These and other features and advantages of the invention will be best understood and appreciated from the following description of a preferred manner of producing open back shoes in accordance with my invention as illustrated in the accompanying drawings in which:

Fig. 2 is a plan view of the stiffening blank,

Fig. 3 is a similar view of the outer ply or integument of the upper showing the stiffening blank in position thereon, Fig. 4 is a similar view showing the lining in place, Fig. 5 is a similar view of the lined blank in condition for assembling, and Fig. 6 represents the same blank as seen from its finished surface.

Figure 1:
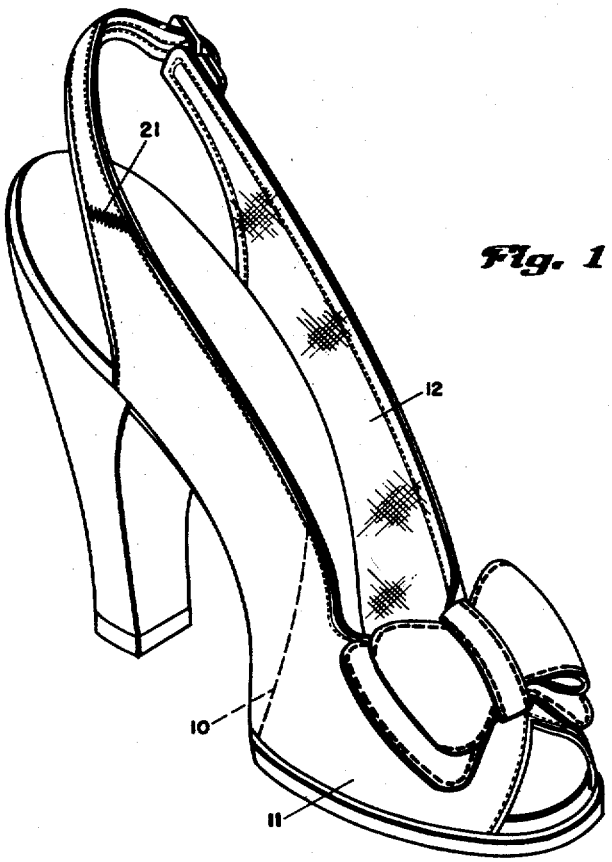
Fig. 1 is a view in perspective of the finished shoe.

The shoe herein shown is provided with a stiffening blank inserted between the outer and lining plies of the upper in the inside shank portion of the shoe, the stiffening blank extending from the edge of the open back aperture to the ball line of the shoe, and from the edge of the sole to the top edge of the upper. It would be within the scope of the invention to provide a similar stiffener in the outside shank portion of the upper, or in both sides of the upper if desired.

The stiffener blank 10, as shown in Fig. 2, has converging front and rear edges. The two front edges are curved and meet at a point 13. The rear edge 14 is of concave curvature and intersects a short straight rear edge at the point 15. The stiffener may be of any desired thermoplastic or solvent-softening material commonly employed for counterstiffeners and comprising a textile fabric saturated or coated with a cellulose ester capable of being gelatinized by a suitable solvent as to permit the stiffener blank to acquire a plastic or moldable state requisite for incorporation into and shaping with the upper during the lasting operation. Cellulose acetate, or cellulose acetate and nitrocellulose are suitable impregnants and these may be readily softened by such solvent mixtures as acetone, diacetone-alcohol, glycol monoacetate, ethylene oxide and the like, all of these being readily available in the shoemaking industry.

The upper blank 11 may be died out from leather or fabric and is shown in Fig. 3 with its unfinished surface uppermost. It will be noted that the left hand edge of the upper, as shown in Fig. 3, corresponds in outline to the left hand edge of the stiffener blank 10. The stiffener is now placed in position upon the upper and cemented thereto. A textile lining blank 12 is next prepared and cemented to the upper 11 and the stiffener blank 10, as indicated in Fig. 4.

The lined upper with its interposed stiffener is now recut as indicated in Fig. 5, the throat being formed in this operation.

The recut upper is now provided with a French cord binding 16 about the toe portion, and a French cord binding 17 about the throat portion. In this operation the upper edge of the stiffener blank 10 is caught by the binding along the throat opening. The French cord binding is now pressed and a line of spaced stitching 18 carried around the edges of the upper which are to be exposed in the finished shoe. At this time a strap 19 is secured to the inner side of the upper, and a buckle 20 to its outer rear end. The line of stitching 21 by which the strap is secured also catches the rear straight edge of the stiffener blank.

The upper is now ready to be assembled with the insole and lasted in the regular manner. Preparatory to this step, however, the stiffener blank 10 is softened by solvent applied through the lining 12. The upper is now lasted with the stiffener blank in soft, limp condition, and the composite structure of the upper is shaped accurately to the contour of the last. After the lasting operation the solvent rapidly evaporates from the stiffener and the latter hardens into the molded shape of the last which has been imparted to it, thereby providing a stiff, resilient, shape-maintaining element in the upper.

For best results it is important to locate the stiffener as shown in the accompanying drawings, that is to say, it must extend fully from the rear edge of the upper at the open heel to, but not in advance of the ball line. It will be, therefore, entirely coextensive with the inside shank portion of the upper from the sole line to the top of the upper. The stiffener thus gives body to support the upper about the aperture of the open back and keeps the inside shack portion of the shoe smooth and free of wrinkles.

While improving the appearance and wearing qualities of the shoe, it will be noted that the process of my invention interferes at no point with the regular shoemaking methods now practiced in the manufacture of women's shoes.

Having thus disclosed my invention and described in detail an illustrative embodiment thereof, I claim as new and desire to secure by Letters Patent:

1. The process of making open back shoes which comprises the steps of providing a stiffening blank of solvent-softening material having forwardly and rearwardly converging edges, cementing the blank in a flat condition to the inner face of a lined upper with the rear converging edges of the blank substantially overlying the edge of the upper at the open back thereof, cementing the lining to the stiffening blank, top stitching the upper and lining, softening the stiffening blank by liquid solvent applied through the lining, and then lasting and finishing the shoe.

2. The process of making open back shoes which comprises the steps of inserting a solvent-softening blank having a curved rear edge between the plies of a lined upper having a curved rear edge defining the aperture of an open back upper, registering the curved edges of the said blank and upper and fastening the blank in place in the inside shank portion of the upper, softening the blank by liquid solvent applied through the lining, shaping the upper to a last, and causing the blank to stiffen in conformity to the shape thereof.

3. An open back shoe including in its structure a lined upper having a binding about its top edge, a fabric stiffening member inserted in place between the upper and lining, a row of stitching along the top and rear edges of the upper confining the stiffening member, said member extending vertically from the sole line toward the top edge and longitudinally from near the edge of the open back into the inside shank portion of the upper and toward but not in advance of the ball line, the stiffening member conforming to the contour of the shoe and resiliently maintaining the upper in smooth condition without wrinkles in wear.

THOMAS A. COCHARY.

No references cited.